(12) United States Patent
Swanick

(10) Patent No.: US 7,547,211 B2
(45) Date of Patent: Jun. 16, 2009

(54) APPARATUS FOR BLENDING BASE PIGMENTS INTO COMPOSITE COLORS AND METHOD FOR MAKING SAME

(76) Inventor: Darren Michael Swanick, 1625 N. Laurel Ave. #17, Los Angeles, CA (US) 90046

( * ) Notice: Subject to any disclaimer, the term of this patent is extended or adjusted under 35 U.S.C. 154(b) by 246 days.

(21) Appl. No.: 11/082,014

(22) Filed: Mar. 16, 2005

(65) Prior Publication Data

US 2005/0208456 A1 Sep. 22, 2005

Related U.S. Application Data

(60) Provisional application No. 60/554,806, filed on Mar. 19, 2004.

(51) Int. Cl.
*G09B 11/04* (2006.01)
(52) U.S. Cl. ........................................................ 434/84
(58) Field of Classification Search .................... 434/84
See application file for complete search history.

(56) References Cited

U.S. PATENT DOCUMENTS

| | | | | |
|---|---|---|---|---|
| 2,565,912 A | * | 8/1951 | Davis | 206/1.7 |
| 2,825,150 A | * | 3/1958 | Steiner | 434/84 |
| 3,278,007 A | * | 10/1966 | Weber | 206/1.8 |
| 3,359,228 A | * | 12/1967 | Nichols | 523/351 |
| 3,777,414 A | * | 12/1973 | Robinson | 434/103 |
| 3,815,265 A | * | 6/1974 | DePauw | 434/103 |
| 3,874,499 A | * | 4/1975 | Barnett, Jr. | 206/1.7 |
| 3,920,597 A | * | 11/1975 | Nicks et al. | 106/266 |
| 4,027,404 A | * | 6/1977 | Brant | 434/104 |
| 4,046,250 A | * | 9/1977 | Amezcua | 206/1.7 |
| 4,911,642 A | * | 3/1990 | Knowles | 434/84 |
| 5,167,704 A | * | 12/1992 | Brower | 106/31.66 |
| 5,242,496 A | * | 9/1993 | Handy | 118/52 |
| 5,320,670 A | * | 6/1994 | Foster et al. | 106/251 |
| 5,474,805 A | * | 12/1995 | Vaughn | 427/207.1 |
| 5,643,341 A | * | 7/1997 | Hirsch et al. | 8/405 |
| 6,343,934 B1 | * | 2/2002 | Johnson, Jr. | 434/84 |
| 6,531,009 B1 | * | 3/2003 | Prior | 156/63 |
| 6,926,527 B2 | * | 8/2005 | Johnson, Jr. | 434/84 |

* cited by examiner

*Primary Examiner*—Gene Kim
(74) *Attorney, Agent, or Firm*—Mills & Onello LLP

(57) ABSTRACT

An apparatus for blending base pigments into composite colors and method for making same utilizing a hollow acrylic palette to allow for the insertion of formula color cards, with pre-designated base pigment guidelines and target colors printed on them, formula measurement cards, with measurement guidelines for recording custom blended composite colors, printed references with base pigment and measurement quantities, and base pigment colors made from a plurality of mediums to use for creating a plurality of composite colors. A preferred embodiment includes storage containers made from a plurality of materials for storing blended composite colors, base pigments provided for cosmetics applications comprised from a plurality of pigments, a palette knife for blending base pigments, a cosmetic sponge for applying the composite colors and directions for use. An additional preferred embodiment includes base pigments provided from a plurality of mediums which will allow for a plurality of composite colors.

14 Claims, 8 Drawing Sheets

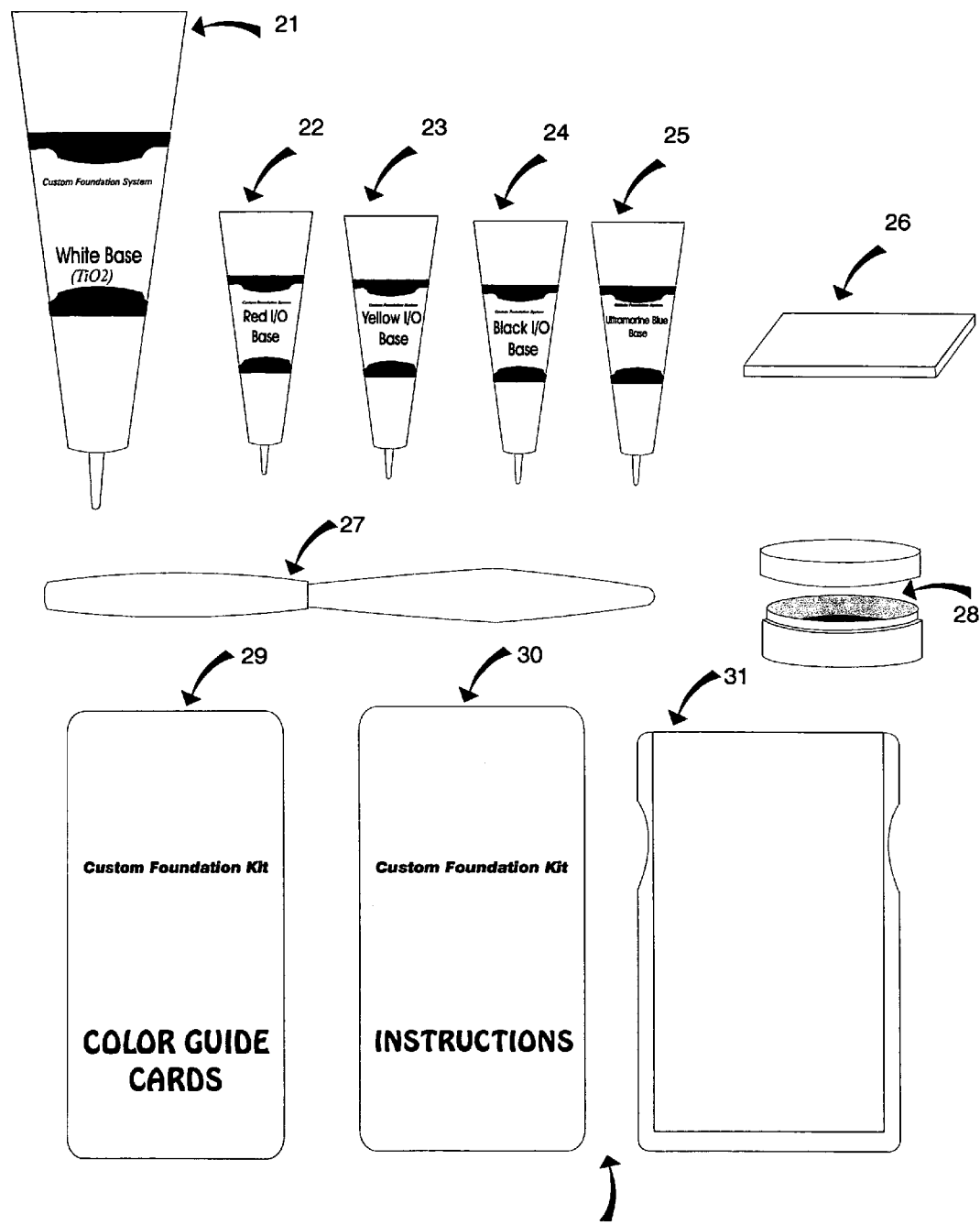
An Apparatus for Blending Base Pigments into Composite Colors and Method for Making Same. #20
Fig: 1

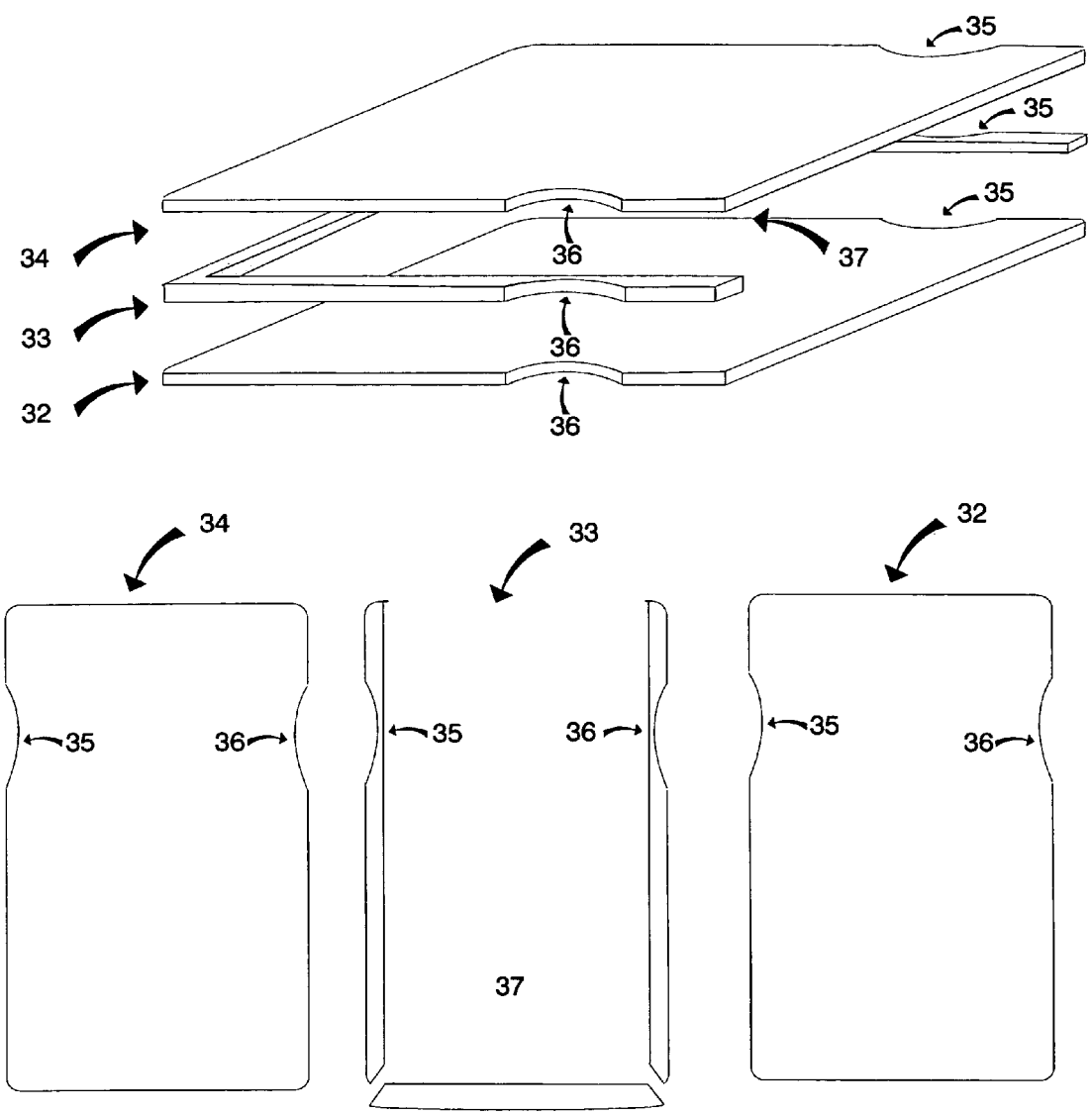
Fig: 2

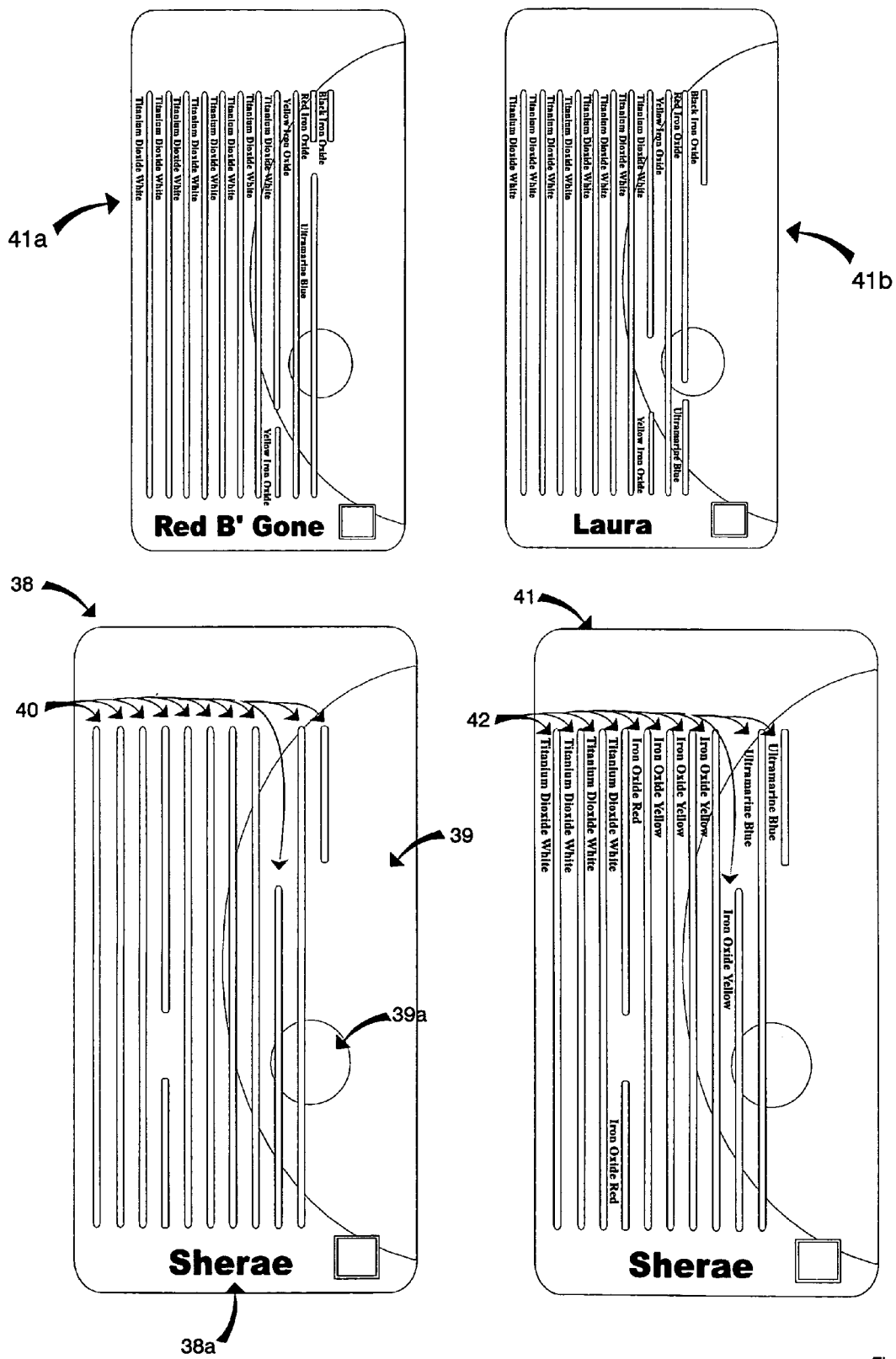
Fig: 3

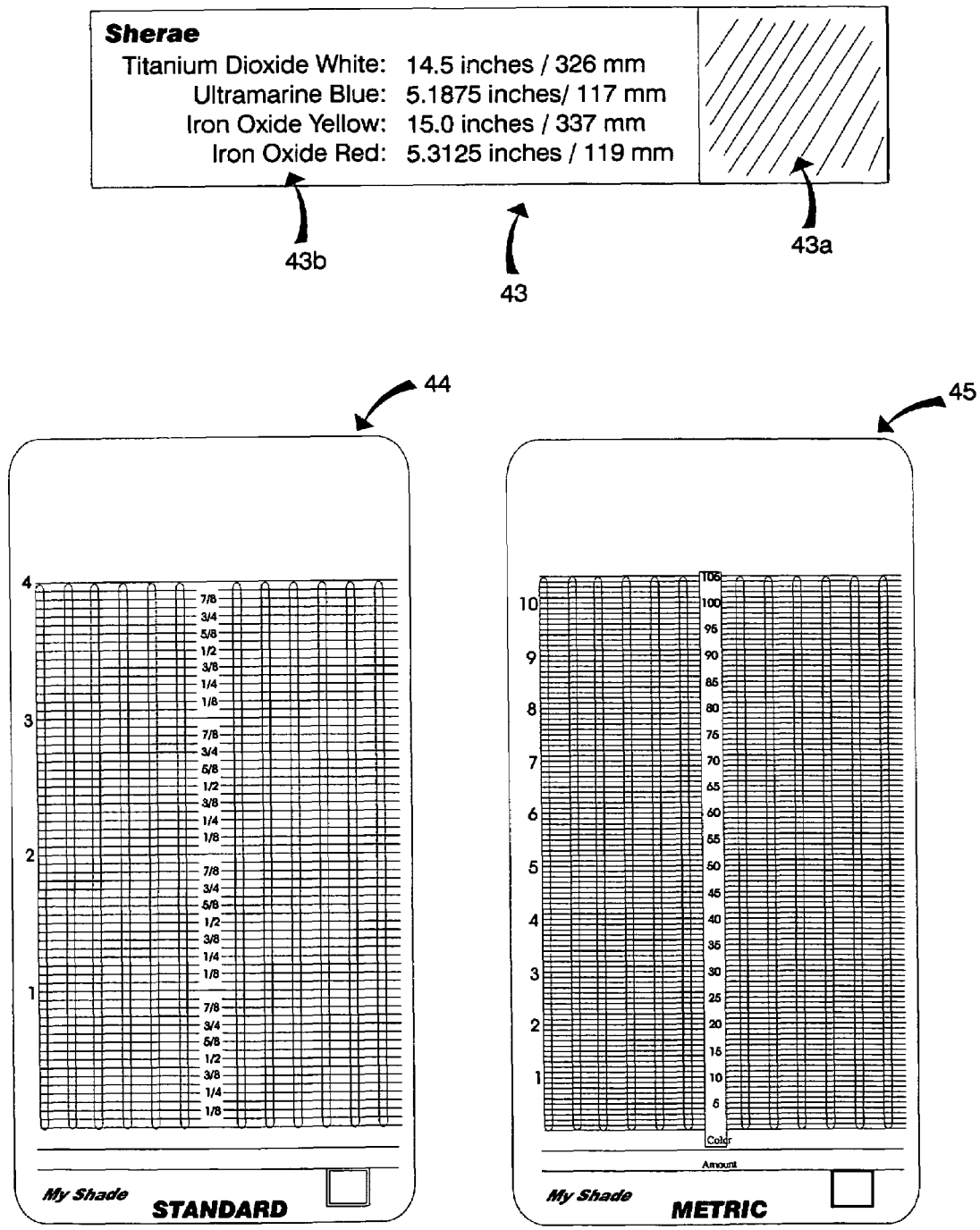
Fig: 4

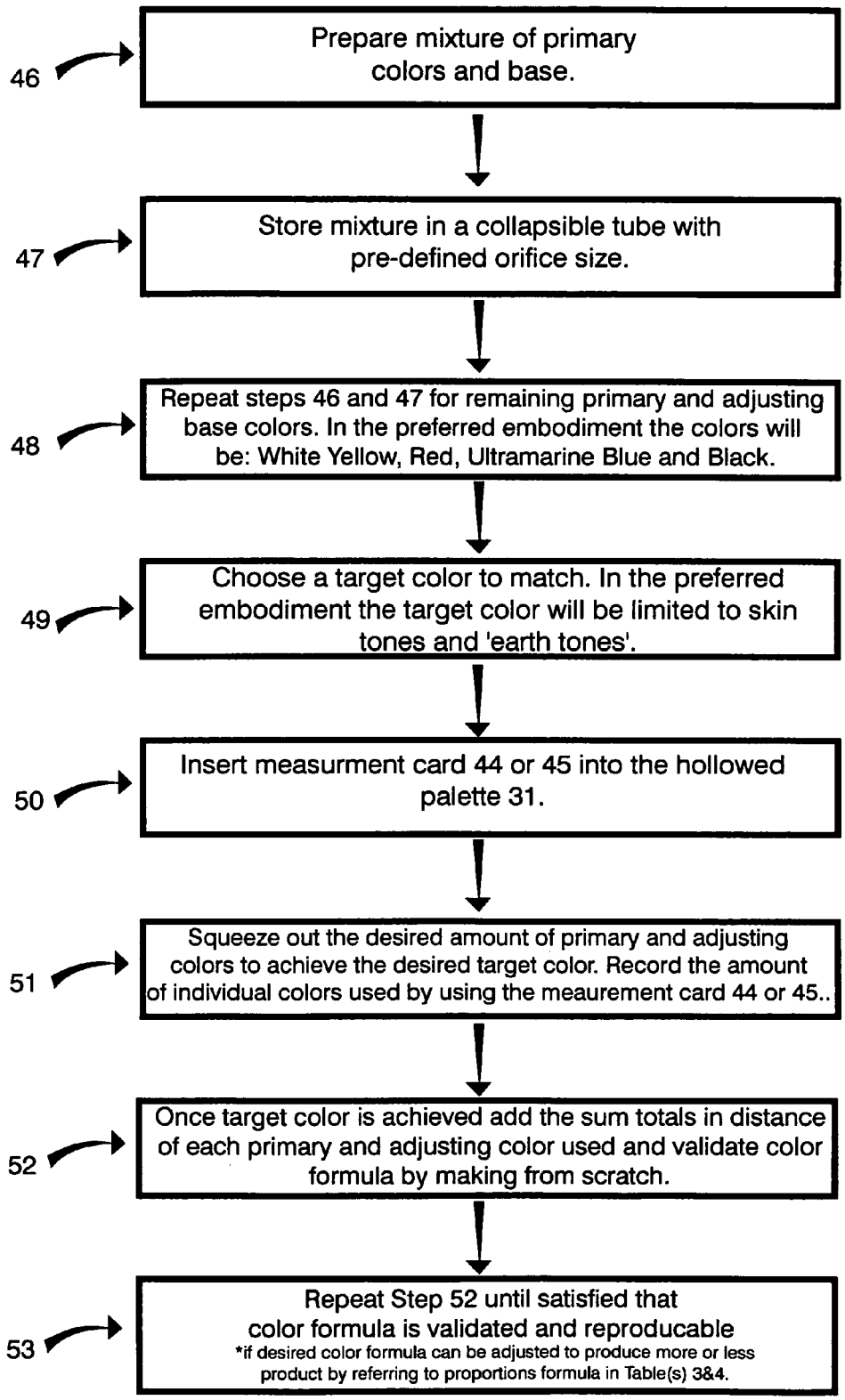
Fig: 5

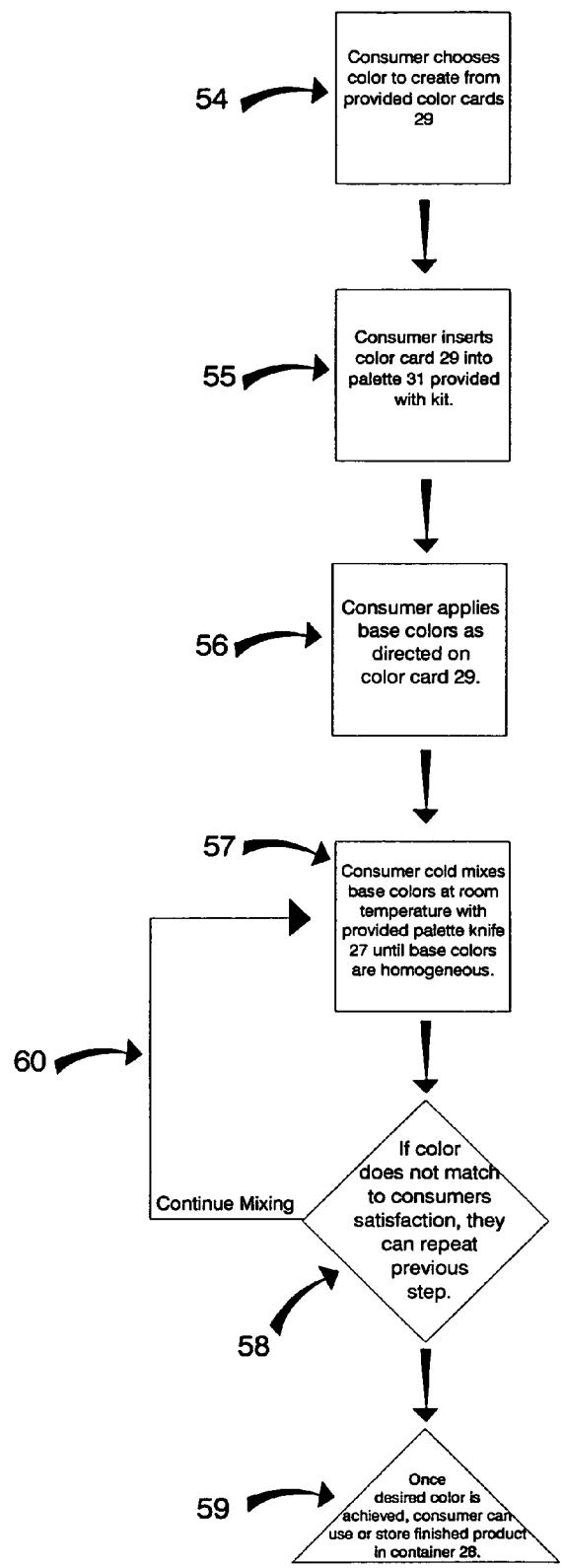
Fig: 6

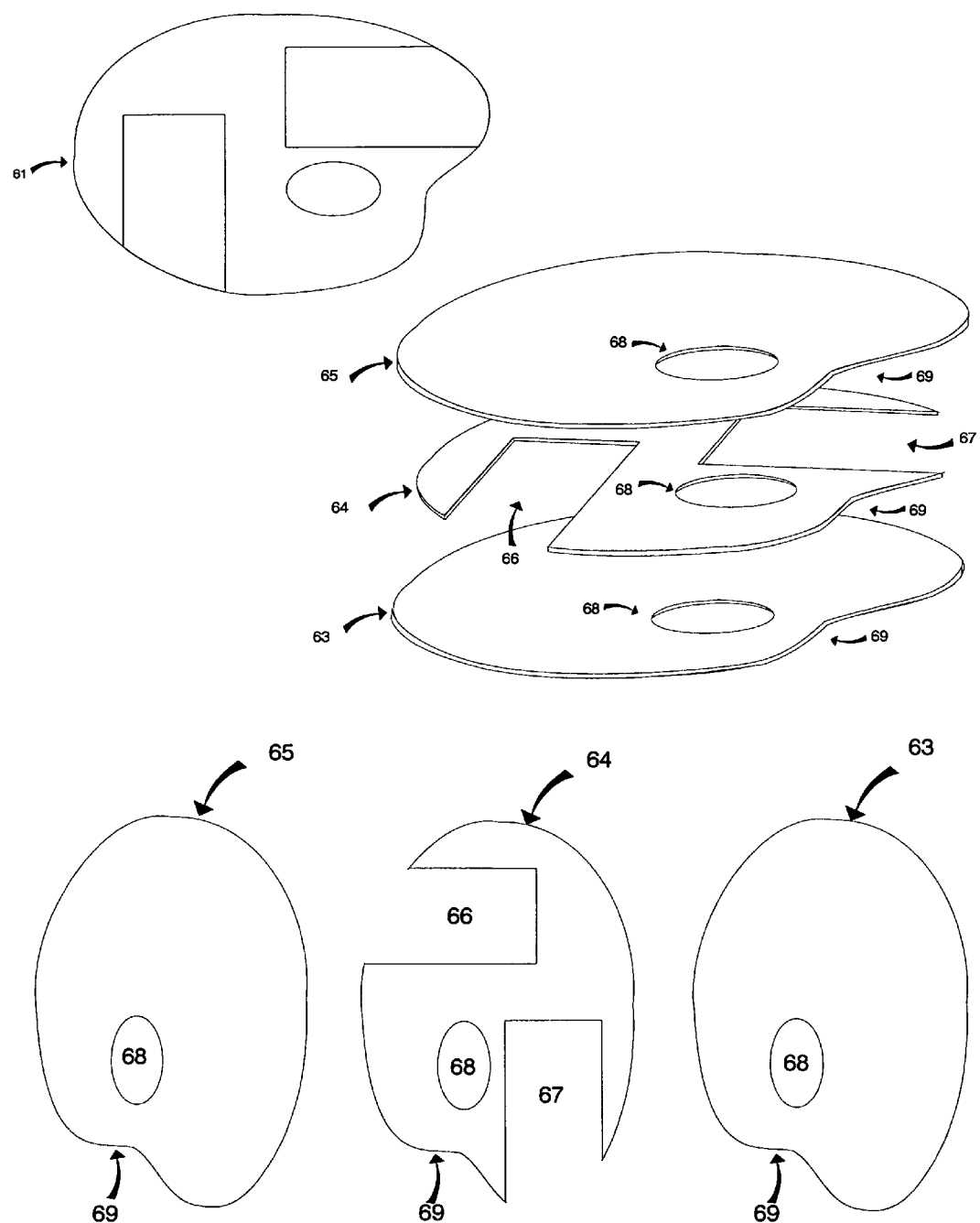
Fig: 7

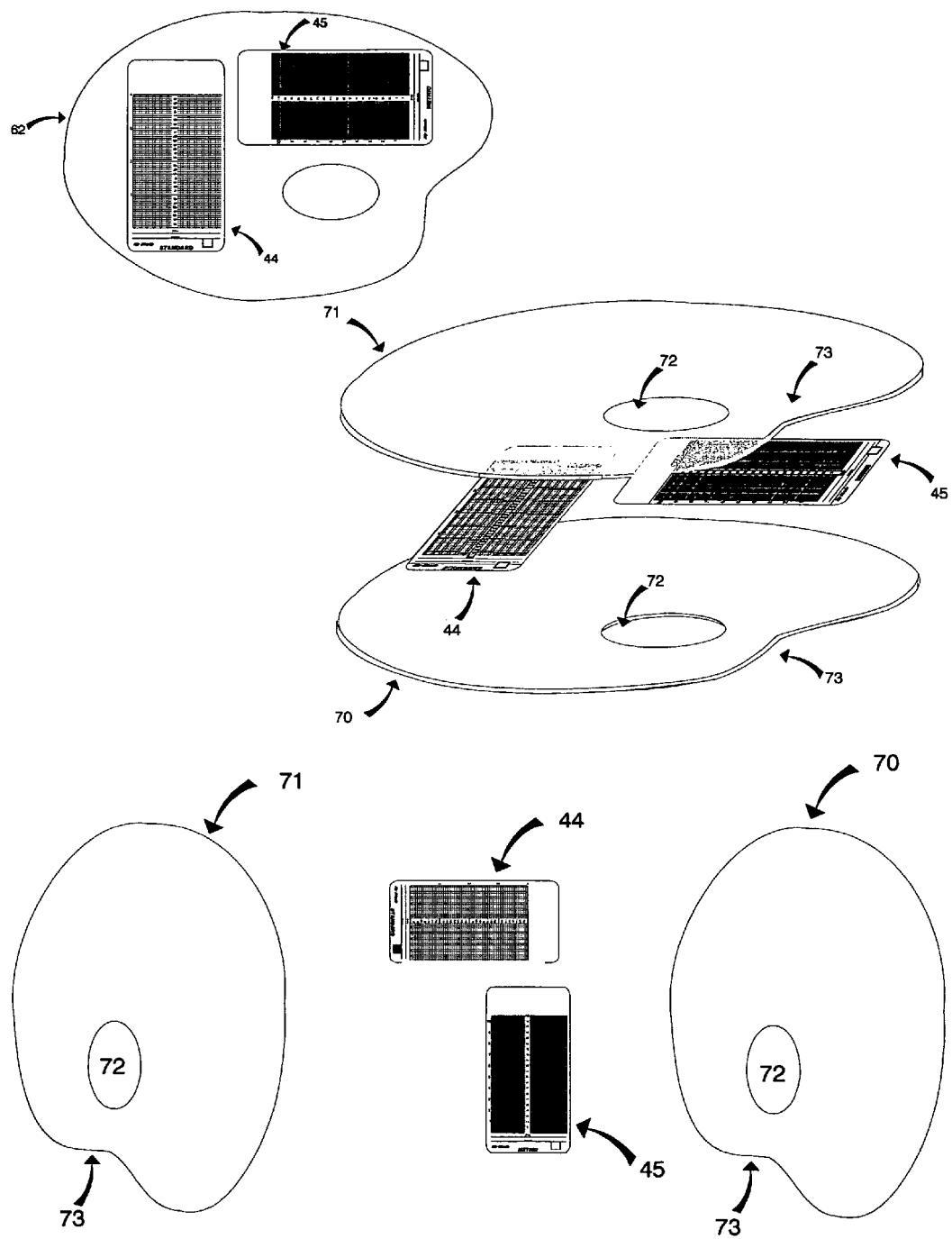
Fig: 8

APPARATUS FOR BLENDING BASE PIGMENTS INTO COMPOSITE COLORS AND METHOD FOR MAKING SAME

CROSS REFERENCE TO RELATED APPLICATIONS

This application is based on provisional application Ser. No. 60/554,806, filed on Mar. 19, 2004.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

Color development is a practice that goes back as far as human history; whether it was color development for coloring articles of clothing, recreating a scene, as in an artistic representation, or creating colors for physical adornment, such as in cosmetics. Color development involves the creation of various color combinations from mixing a few primary base colors to achieve a plurality of composite colors. Color development continues to be useful in the fields of health and beauty, fashion, cosmetics, art, residential and commercial painting, printing and other fields that utilize color. For example, in the field of cosmetics, cosmetic technicians blend primary colorants to produce a shade that fits the consumer or that the customer desires. The basis for choosing a shade may be a customer's skin color, which may be dictated by the customers ethnicity, exposure to the sun, age and the like; or it may be dictated by the infinite number of colors found in other products, the imagination of the consumer or technician, or in nature. Similarly in art, the artist will create a plurality of composite colors from a handful of primary base colors in order to create their expressions in a plurality of mediums. The artist may create their desired composite color from copying another color that exists in a plurality of places, or they may create their color from out of their imagination. Historically, a good color developer stems from many years of repetative use of primary base colors to develop an "eye" and understanding of how different pigments combine to form color combinations.

For the consumer, technical person and/or artist, color development has historically been a learnt art through a means of trial and error. Various attempts have been made at simplifying and quantifying methods in color development. These attempts have been demonstrated in U.S. Pat. No. 2,878,590 (Dodge) "Color Mixing Chart", U.S. Pat. No. 3,815,265 (DePauw) "Color Blending & Paint Mixing Tray and U.S. Pat. No. 5,209,664 (Wilcox) "Artists Palette". In the field of cosmetics the acknowledgement of color development for the consumer being a matter of trial and error was written in U.S. Pat. No. 6,284,228 (Markowitz) which, although allowing the consumer to create their own cosmetic foundation gave no means for the consumer to quantify their mixture and provides no quantifiable starting point for the consumer to develop their color. The matter of being able to quantify a color formula was covered in U.S. Pat. No. 6,402,120 (Swaab) which was intended for the creation of custom lipstick products for use at the point of sale to the consumer and also available for home use by the consumer. Whereas Swaab '120 offered a quantifiable method for combining shades of colors it didn't offer a starting point for those unfamiliar with color development and it would require its user to also blend additional bases and raw materials with their color mixtures to create a finished product. With continued reference to the cosmetic industry, the majority of consumers have generally been limited to the colors they would buy as ones which have already been produced. Over recent years some companies have tried to provide machines and methods that would allow for more personalized custom blending services as have been demonstrated in U.S. Pat. No. 6,177,093 (Lombardi), U.S. Pat No. 6,437,866 (Flynn), U.S. Pat. No. 6,510,366 (Murray), U.S. Pat. No. 6,516,245 (Dirksing), U.S. Pat. No. 6,603,550 (Flynn), U.S. Pat. No. 6,715,642 (Engel) and U.S. Pat. No. 6,782,307 (Wilmott), but these efforts have been limited to being done at the point of sale by trained technicians and have left the consumer unable to blend their own products.

To date color development has been a learning experience though the method of trial and error by the consumer as is such in the field of art, the field of cosmetics and other before mentioned industries, custom color blending has generally been limited to an act performed at the point of sale to the consumer by a trained technician, or in art a skill developed over time. The few inventions which have tried to simplify color development for the consumer have failed to provide a simplified enough method for those with no color development experience, or have provided a method which would require additional mixing and preparation skills, without providing adequate starting points for people unfamiliar with color development. For artists, this could result in having to use much more base material than they need to develop their desired color. For the consumer who has their product blended at the point of sale, they are limited to the product that is made for them, unable to alter it on their own if they later find the color does not suit their needs or desires. This is best illustrated in the field of cosmetics with regard to makeup foundation colors where there are numerous variations in consumer skin tones and the final appearance of the foundation is dictated by the consumers skin tone and the light in which that foundation is made. What is needed is a color developing system designed to be simple to use for the mass market and one which would require no prior skills in color developing. In addition, this color developing system would provide base colors that are already fully combined with their bases and would require no additional chemicals to be added and most preferably products that can be blended at room temperature. The following disclosed invention provides the apparatus and methodology which will allow a consumer with no prior skills in the art, to custom blend their own infinite number of composite colors from either pre-formulated color combinations or from the consumers preference, which can be recorded and reproduced at their leisure. Furthermore, the preferred embodiment of the invention will also provide the consumer with a plurality of base colors to work with, a palette knife for blending them, storage containers for their composite colors and easy to follow instructions as well as formula color guide cards to aid and assist in their understanding of color developing. In addition, even though the invention is presented in the preferred embodiment as being a kit for developing face cosmetics (including but not limited to; foundations, highlights, shaders, neutralizers and correctives) it is understood that this invention can be applied to all color cosmetics as well as all artistic mediums and virtually any product in which various primary base colors can be combined to form composite colors.

BRIEF SUMMARY OF THE INVENTION

The primary object of the invention is to provide an apparatus which allows the consumer to custom blend and quantify their own face cosmetics (including all color cosmetics including but not limited to: foundations, highlights, neutralizers, shaders and correctives).

Another object of the invention is to provide an apparatus which allows the consumer to custom blend and quantify their own cheek cosmetics (including all color cosmetics including but not limited to: blush, blushers, rouge and cheek color).

Another object of the invention is to provide an apparatus which allows the consumer to custom blend and quantify their own eye cosmetics (including all color cosmetics including but not limited to: eye shadows, eye color, highlights, correctives and shaders).

A further object of the invention is to provide an apparatus which allows the consumer to custom blend and quantify their own lip cosmetics (including all color cosmetics including but not limited to: lipstick, lipstain, lip color, lip highlights, lip gloss, lip rouge and lip balm).

Yet another object of the invention is to provide an apparatus which allows the consumer to custom blend and quantify their own artistic colors (including all artistic mediums including but not limited to: oils, acrylics, water colors, tempras and latex).

Still yet another object of the invention is to provide an apparatus which allows the consumer to custom blend and quantify their own plurality of base pigments into a plurality of composite colors.

Another object of the invention is to provide a process and method which enables the consumer to easily duplicate pre-existing color cosmetic formulas, as they pertain to face, cheek, eye and lip color cosmetics.

Another object of the invention is to provide a process and method which enables the consumer to easily duplicate pre-existing color formulas as they pertain to artistic applications.

A further object of the invention is to provide a process and method which enables the consumer to easily duplicate pre-existing color formulas from a plurality of base pigments into a plurality of composite colors.

Yet another object of the invention is to provide a process and method which allows the consumer to easily record and duplicate their own color blends, as they pertain to face, cheek, eye and lip color cosmetics.

Still yet another object of the invention is to provide a process and method which allows the consumer to easily record and duplicate their own color blends, as they pertain to artistic applications.

Another object of the invention is to provide a process and method which allows the consumer to easily record and duplicate their own color blends from a plurality of base pigments into a plurality of composite color blends.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an apparatus for blending base pigments into composite colors and method for making same comprising: an acrylic palette with a hollowed space to allow for the insertion of a formula color card; formula color cards, which have pre-designated base pigment guidelines and final target colors printed on them; formula measurement cards, which have measurement guidelines for recording custom blended composite colors; printed color guide references with base pigment and measurement quantities; and base pigment colors made from a plurality of mediums to use for creating a plurality of composite colors.

In accordance with a preferred embodiment of the invention, there is disclosed a process for an apparatus for blending base pigments into composite colors and method for making same comprising the steps of: an acrylic palette with a hollowed space to allow for the insertion of a formula color card; formula color cards, which have pre-designated base pigment guidelines and final target colors imprinted on them; formula measurement cards, which have measurement guidelines for recording custom blended composite colors; printed color guide references with base pigment and measurement quantities; and base pigment colors made from a plurality of mediums to use for creating a plurality of composite colors.

In accordance with a preferred embodiment of the invention, there is disclosed an apparatus for blending base pigments into composite colors and method for making same comprising: an acrylic palette with an embedded measurement device; formula color cards, which have pre-designated base pigment guidelines and final target colors imprinted on them; formula measurement cards, which have measurement guidelines for recording custom blended composite colors; printed color guide references with base pigment and measurement quantities, for use with base pigment colors made from a plurality of mediums to use for creating a plurality of composite colors.

In accordance with a preferred embodiment of the invention, there is disclosed a process for an apparatus for blending base pigments into composite colors and method for making same comprising the steps of: an acrylic palette with an embedded measurement device; formula color cards, which have pre-designated base pigment guidelines and final target colors imprinted on them; formula measurement cards, which have measurement guidelines for recording custom blended composite colors; printed color guide references with base pigment and measurement quantities, for use with base pigment colors made from a plurality of mediums to use for creating a plurality of composite colors.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a plan view of the components which comprise the preferred embodiment of the invention.

FIG. 2 is an exploded view of a palette for use with the invention.

FIG. 3 is a plan view of the color guide cards used with the invention.

FIG. 4 is a plan view of the measurement cards used with the invention.

FIG. 5 is a flow chart of the operations that comprise the method.

FIG. 6 is a flow chart of the operations that comprise the method.

FIG. 7 is an exploded view of a 2$^{nd}$ palette design for the invention.

FIG. 8 is an exploded view of a 3$^{rd}$ palette design for the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

In the following detailed description of the preferred embodiments, reference is made to the accompanying drawings, which form part of this application. The drawings show, by way of illustration, specific embodiments in which the invention may be practiced. It is to be understood that other embodiments may be utilized and structural changes may be made without departing from the scope of the present invention.

In accordance with the present invention, FIG. 1 shows the elements comprising the preferred embodiment of an apparatus for blending base pigments into composite colors generally indicated by reference number 20. In the preferred embodiment the apparatus will be utilized for creating a cosmetic product for use as a foundation, highlight, neutralizer, shader or corrective. It is to be further understood that the preferred embodiment is only one example of the full scope of the invention. The description of the elements that comprise 20 are as follows: 30 grams of titanium dioxide white base in a aluminum tube with a 0.11 inch orifice tip 21, 10 grams of red iron oxide base in a aluminum tube with a 0.06 inch orifice tip 22, 10 grams of yellow iron oxide base in a aluminum tube with a 0.06 inch orifice tip 23, 10 grams of black iron oxide base in a aluminum tube with a 0.06 inch orifice tip 24, 10 grams of ultramarine blue base in a aluminum tube with a 0.06 inch orifice tip 25, a foam latex cosmetic sponge applicator 26, an artist palette knife 27, plastic storage container(s) 28, color guide card(s) 29, instruction/directions for use booklet 30 and a clear acrylic palette with a hollowed space 31.

Foam Latex Sponge

Foam latex sponge 26 in the preferred embodiment is made of non latex polyurethane foam and conforms generally to the following size—1 inch by 1 and ½ inch by ¼ inch thick. Other materials known to the art can be substituted for foam latex sponge 26 and still fall within the scope of the invention.

Artist Palette Knife

Artist palette knife 27 in the preferred embodiment conforms to the following description: total length 8 inches, blade length 3-⅜ inch, handle length 4-⅝, blade is made of steel, handle is made of wood. Other materials known in the art can be substituted for artist palette knife 27 and still fall within the scope of the invention.

Plastic Storage Container

Plastic storage container 28 in the preferred embodiment conforms to the general description of being made of polypropylene and being of a size of 10 ml. Other materials known in the art can be substituted for the plastic storage container 28 and still fall within the scope of the invention.

Palette

Palette 31 is preferably made of three layers of acrylic glass. Other materials known in the art may be used. In FIG. 2 the first 34 and third 32 layers of the palette 31 are preferably of the same dimension and shape. The second layer 33 has the same outer dimensions and shape as the first 32 and third 34 layers with the inside dimensions being adequate in size to accept the insertion of a color guide card 38 (FIG. 3). The color guide card 38 preferably fits snugly within the hollowed slot created by 33 and may preferably slide in and out of hollowed space 37. Hollowed space 37 could equally accept additional color guide cards as shown in 29, 38, 41, 44 and 45.

The second layer 33 is preferably configured to be positioned in between the first 34 and third 32 layers, and thus the first 34 and third 32 layers, serve as the top and bottom layers, respectively or vice versa. The user may mix colors on the first layer 34 and may refer to the color guide card 38, which may be seen through the transparent first layer 34, during the mixing process for guidance as to the proper amount of particular color to use. A first palette notch 35 may be provided for steadying the palette 31. First palette notch 35 is preferably defined by the first 34, second 33 and third 32 layers of the palette. Additionally, first palette notch 35 is preferably sized to accommodate the users thumb.

A second palette notch 36 may further be provided. The second notch 36 is preferably formed on the opposing edge of palette 31, from notch 35. The second palette notch 36 may allow the user to hold palette 31 comfortably between their thumb and opposing digits.

Color Guide Card

With reference now to FIG. 3, an embodiment of a color guide card 38 is shown. The color guide card 38 is preferably shaped to fit the card slot 37 shown in FIG. 2. Color guide card 38 is preferably made of paper stock. Alternatively, color guide card 38 may be made using other materials known in the art. Color guide card 38 preferably includes a target color area 39, which is configured to show the user the final color that will result from mixing the base colors by following the pre-designated guideline amounts as shown in color measurement guide area 40. Additionally, if the base colors deviate in appearance from their wet to dry state, a wet color mark 39a can be included on the color guide card 38.

Color measurement guide area 40 preferably shows the identities of the base colors to use and their respective amounts. Color measurement guidelines area 40 is preferably configured to indicate to the user the identity of the color to use by imprinting the actual color on the color guide card 38. Alternatively, with reference to color guide card 41, color measurement guide area 42 indicates to the user the identity of the color to use by using labels on them.

Color measurement guidelines area 40 and 42 further tells the user the amount of the base color to be blended for the mixture to arrive at the target color. The amount of base color is preferably indicated by the size of the line. For example, with continued reference to FIG. 3, color measurement guidelines area 40 and 42 tells the user to use three 4 inch and one 2-½ inch line of titanium dioxide white base, one 4 inch and one 1-5/16 inch line of red iron oxide base, three 4 inch and one 3 inch line of yellow iron oxide base and one 4 inch and one 1-3/16 inch line of ultramarine blue base. The process for determining the size of the line to imprint on the color guide card for each color is discussed below. It is noted that the plurality of lines may be substituted with other shapes or indicia and still fall within the scope of the invention.

Primary Base Colors

An apparatus for combining base colors into composite colors 20 preferably includes a plurality of primary base colors to serve as starting materials in developing various composite colors. In the preferred embodiment, the primary base colors are red iron oxide, ultramarine blue and yellow iron oxide. A plurality of colors may be made from these primary base colors. Additionally the reflectance (opacity) and tone of the colors made from the primary base colors may be adjusted by adding titanium dioxide white and black iron oxide base colors (hereinafter referred to as "adjusting base colors"). The primary base colors may be other colors besides red, blue and yellow and fall within the scope of the invention.

In the preferred embodiment for cosmetic applications, primary base colors are preferably made of red iron oxide, yellow iron oxide and ultramarine blue pigments. The primary base color pigments are preferably mixed with a base comprised of but not limited to: water, oil, waxes or a combination of a plurality of raw materials, including but not limited to: water, oils and/or waxes. The proportion between each pigment and base is preferably 12.5% pigment and 87.5% base. The proportion of pigments to base may be varied and still fall within the scope of the invention.

Adjusting base colors are preferably black iron oxide and titanium dioxide white pigments. Adjusting base pigment colors are also preferably mixed with any base as described above and according to the preferred proportions described above. These materials may be substituted with other raw materials and still fall within the scope of the invention. For example, the primary base colors could be made of cadmium red, cadmium yellow and pthalocyanide blue, if the application were for purely an artistic application.

Table 1 shows an example of the way the primary and adjusting base pigment colors are mixed with their respective bases to arrive to a 100 gram mixture of foundation makeup.

TABLE 1

| Color (Sherae) | Amt. Used (in grams) | Amt. of Pigment (12.5%) | Amt. of Base (87.5%) |
|---|---|---|---|
| Titanium Dioxide White Base | 54.625 | 6.828 | 47.797 |
| Iron Oxide Yellow Base | 26.703 | 3.338 | 23.365 |
| Iron Oxide Red Base | 9.444 | 1.181 | 8.263 |
| Ultramarine Blue Base | 9.228 | 1.153 | 8.075 |
| TOTAL | 100.00 | 12.500 | 87.500 |

The primary and adjusting pigment colors that are mixed with their respective bases in the amounts indicated above are preferably, individually stored in a squeezable tube. The squeezable tube preferably has an orifice of a predetermined size. The squeezable tube may be made of plastic, aluminum or other materials known in the art. Other container materials known in the art may be used in lieu of the tube.

Further demonstration is shown in the following cosmetic formula(s) and process for primary base and adjusting base colors.

In the preferred embodiment of an apparatus for blending base pigments in to composite colors 20, five base colors are used to create a plurality of colors for use as cosmetic foundation, highlight, shading, neutralizers and corrective colors. Table 2 and table 3 list the formulas used to create the primary base colors yellow iron oxide 23, red iron oxide 22, ultramarine blue 25 and the adjusting base colors of black iron oxide 24 and titanium dioxide white 21. A combination of any or all of the primary and adjusting base colors can be used to create a composite color in the preferred embodiment.

TABLE 2

Titanium dioxide white 21, yellow iron oxide 23, red iron oxide 22, and black iron oxide 24 cosmetic base(s)

| Sequence | Description | % w/w |
|---|---|---|
| 1 | Deionized water | 52.57 |
| 2 | Laracare A200 (Larex) | 1.50 |
| 3 | Diglycerin 801 (US Cosmetics) | 3.00 |
| 4 | Germall Plus (ISP) | 0.10 |
| 5 | Heather Extract (The Collaborative Group) | 0.50 |
| 5 | Micromerol (The Collaborative Group) | 0.75 |
| 6 | SA Powder La Vie (US Cosmetics) | 1.00 |
| 6 | Propylene Glycol (RITA) | 10.00 |
| 6 | Pigment<br>Titanium Dioxide-AHD-TRI-77891 (US Cosmetics)<br>Red Iron Oxide-AHD-R-77491 (US Cosmetics)<br>Yellow Iron Oxide-AHD-Y-77492 (US Cosmetics)<br>Black Iron Oxide-AHD-B-77499 (US Cosmetics) | 12.50 |
| 7 | SFACE CR-1001 (US Cosmetics) | 0.30 |
| 7 | SFACE IS 201P (US Cosmetics) | 1.80 |
| 7 | SFACE L-1001 (US Cosmetics) | 0.23 |
| 7 | Avacado Butter (Strahl & Pitsch) | 1.50 |
| 7 | Sunflower Butter (Strahl & Pitsch) | 1.50 |
| 7 | Emersol 7036 (Cognis) | 0.50 |
| 8 | Formulation Aid DC5225C (Dow Corning) | 10.00 |
| 8 | KSG-210 (Shin Etsu) | 1.75 |
| 9 | Phenonip (Clarient) | 0.50 |
| TOTAL | | 100.00% |

TABLE 3

Ultramarine blue base 25

| Sequence | Description | % w/w |
|---|---|---|
| 1 | Deionized water | 52.17 |
| 2 | Laracare A200 (Larex) | 1.50 |
| 3 | Diglycerin 801 (US Cosmetics) | 3.00 |
| 4 | Germall Plus (ISP) | 0.10 |
| 5 | Heather Extract (The Collaborative Group) | 0.50 |
| 5 | Micromerol (The Collaborative Group) | 0.75 |
| 6 | SA Powder La Vie (US Cosmetics) | 1.00 |
| 6 | Propylene Glycol (RITA) | 10.00 |
| 6 | Pigment<br>Ultramarine blue-DIANTHUS83-UB-77007- (US Cosmetics) | 12.50 |
| 7 | SFACE CR-1001 (US Cosmetics) | 0.30 |
| 7 | SFACE IS 201P (US Cosmetics) | 1.80 |
| 7 | SFACE L-1001 (US Cosmetics) | 0.23 |
| 7 | Avacado Butter (Strahl & Pitsch) | 1.65 |
| 7 | Sunflower Butter (Strahl & Pitsch) | 1.65 |
| 7 | Emersol 7036 (Cognis) | 0.60 |
| 8 | Formulation Aid DC5225C (Dow Corning) | 10.00 |
| 8 | KSG-210 (Shin Etsu) | 1.75 |
| 9 | Phenonip (Clarient) | 0.50 |
| TOTAL | | 100.00% |

To process the supplied formula for the preferred embodiment of an apparatus for blending base pigments into composite colors 20: Pre-weigh a double amount of sequence 6 materials and blend with either a spatula or propeller mixer. Mix until a slurry. Take premix and mill through a 3 roll mill until pigments are dispersed.

In the main mixing vessel charge sequence 1 and with a sweep mixing blade, mix while heating batch to 75 degrees celsius. While batch is heating charge sequence 2, 3, 4 and 5, continue mixing until product is clear and homogenous.

Weigh back and charge sequence 6 slurry to main batch, maintain temperature at 75 degrees celsius.

In a separate vessel pre-weigh sequence 7 and heat to 75 degrees celsius.

When sequence 7 is homogenous slowly add sequence 7 to main batch while maintaining temperature and mixing of main batch.

Once charged, heat batch to 80 degrees celsius and maintain mixing. Continue mixing for 5 minutes at 80 degrees celsius.

Lower heat of main batch to 75 degrees celsius while maintaining mixing.

In a separate vessel pre-weigh and pre mix sequence 8. Heat sequence 8 to 70 degrees celsius.

Slowly lower main batch temperature while maintaining mixing.

When batch is between 73-75 degrees celsius, slowly charge sequence 8.

Batch will emulsify at 73 degrees celsius. Maintain mixing for five minutes then begin to cool batch.

At 55 degrees celsius, charge sequence 9.

Continue mixing and cooling batch to 30 degrees celsius. At 30 degrees celsius cease mixing and transfer batch into storage containers.

After base colors are made they can be transferred into tubes at room temperature. For the purpose of the preferred embodiment of this invention the base colors will be arranged in the following tubes:

Titanium dioxide white base—fill into a 30 ml collapsible aluminum tube with a nasal tip and a 0.11 inch orifice 21.

Yellow iron oxide base—fill into a 10 ml collapsible aluminum tube with a nasal tip and a 0.06 inch orifice 23.

Red iron oxide—fill into a 10 ml collapsible aluminum tube with a nasal tip and a 0.06 inch orifice 22.

Black iron oxide—fill into a 10 ml collapsible aluminum tube with a nasal tip and a 0.06 inch orifice 24.

Ultramarine blue base—fill into a 10 ml collapsible aluminum tube with a nasal tip and a 0.06 inch orifice 25.

Preparing the Color Guide Card

FIG. 5 shows the process of how to create the color guide card formula, including how one determines the size of the color card lines, which is indicative of the color amount to use to create the target color. Beginning at steps 46-48, the primary and adjusting base colors are preferably first prepared by mixing the individual pigment with a base. The proportion of the individual pigment and the base may be 12.5% and 87.5%, respectively. It is noted that other proportions may be used. Each mixture is preferably stored in a squeezable tube with a predefined orifice size.

After all the primary and adjusting colors are prepared, a target color is preferably created. The target color is chosen by selecting a color to match (step 49). In the preferred embodiment the colors would be primarily limited to skin tones and earth tones. However, with the addition of other base pigments a full spectrum of composite colors can be achieved. After a target color is chosen, insert measurement card 44 or 45 into hollowed palette 31 (step 50). The target color is replicated by taking a portion of each primary and adjusting colors then squeezing the appropriate primary or adjusting color and recording the amount of each primary and adjusting color (in distance) needed to replicate the target color (step 51). Once target color is achieved add the individual sum totals in distance of each primary and adjusting color used and validate color formula by making from scratch (step 52). Repeat step 52 until satisfied that the color formula is validated and reproducible (step 53). The desired color formula can be adjusted to produce more or less product by referring to the following proportions formula(s) for the color sherae used in color guide card 38 as a guide:

TABLE 4

To decrease the yield of a formula in the preferred embodiment (from a formula that yields 40 inches of material to one that yields 20 inches of material):
Formula: Desired amount (B)/Developed amount (A) = Factor (C)
B/A = C
20.00 (B)/40.00 (A) = 0.5 (C)
The preferred lowest measuring amount is 0.0625 inch ($\frac{1}{16}$)-round figures up or down accordingly.

| BASE | Developed amount Qty. (in inches) | Desired amount Qty. (in inches) | Formula |
|---|---|---|---|
| White(TiO2) | 14.50(A4) | 7.25(B4) | A4 * C = B4 |
| Yellow Iron Oxide | 15.00(A3) | 7.50(B3) | A3 * C = B3 |
| Red Iron Oxide | 5.3125(A2) | 2.6875(B2) (rounded up) | A2 * C = B2 |
| Ultramarine Blue | 5.1875(A1) | 2.5625(B1) (rounded down) | A1 * C = B1 |
| TOTAL | 40.00(A) | 20.00(B) | A * C = B |

TABLE 5

Inversely, to increase the yield of a formula in the preferred embodiment (from a formula that yields 20 inches of material to a formula that yields 40 inches of material):
Formula: Desired amount (E)/Developed amount (D) = Factor (F)
E/D = F
40.00 (E)/20.00 (D) = 2 (F)

| BASE | Developed amount Qty. (in inches) | Desired amount Qty. (in inches) | Formula |
|---|---|---|---|
| White(TiO2) | 7.25(D4) | 14.50(E4) | D4 * F = E4 |
| Yellow Iron Oxide | 7.50(D3) | 15.00(E3) | D3 * F = E3 |
| Red Iron Oxide | 2.6875(D2) | 5.375(E2) | D2 * F = E2 |
| Ultramarine Blue | 2.5625(D1) | 5.125(E1) | D1 * F = E1 |
| TOTAL | 20.00(D) | 40.00(E) | D * F = E |

Even though, by rounding up the red iron oxide distance and rounding down the ultramarine blue distance in TABLE 4 resulted in a slightly different measurement amount of those respective colors in TABLE 5, the percent deviation is 1% and is an acceptable deviation that would be easily compensated for in mixing the base colors if it is even perceived.

The target color, once chosen and replicated is preferably identified on the target color area 39 of the color guide card 38. The adjusted color guide lines are preferably identified as 40 on color guide card 38. Alternatively, the target color may be associated with a name 38*a* and the name may be imprinted on the color guide card 38.

Furthermore, the length of each line of the color guide card may be determined from a weight composite formula of primary and adjusting base colors by considering the following factors: the size of the orifice of the tube that contains the primary and adjusting base colors, the weight by inch of material delivered from that tube under constant pressure, the individual weight of the primary and adjusting base colors used and the final yield in distance that is desired for the composite color. Using the data from Table 1 further consider the following assumptions: (1) the titanium dioxide white base will be stored in a tube that has an orifice size of 0.11 inch, and (2) the tube allows 0.19 grams of white base to be delivered per inch of mixture dispensed when squeezed under constant pressure. For the remaining colors the following assumptions are considered: (1) each remaining base (red, yellow and ultramarine blue) will be stored in a tube that has an orifice size of 0.06 inch, and (2) the tube allows 0.09 grams of base to be delivered per inch of mixture dispensed when squeezed under constant pressure.

Thus, in table 6, the first step will be to convert the weight formula to a distance formula in inches utilizing the following formula:

TABLE 6

Distance in inches = weight of base/weight per inch of product squeezed

| Color (Sherae) | Distance (in inches) | Weight of Base (in grams) | Weight per inch (in grams) |
|---|---|---|---|
| Titanium Dioxide White Base | 287.500 | 54.625 | 0.19 |
| Iron Oxide Yellow Base | 296.700 | 26.703 | 0.09 |
| Iron Oxide Red Base | 104.933 | 9.444 | 0.09 |
| Ultramarine Blue Base | 102.533 | 9.228 | 0.09 |
| TOTAL | 791.666 | 100.00 | |

With the total distance of the sherae color calculated at 791.666 inches the distance formula can be decreased to yield a formula that will measure a total of 40 inches by employing the same formula used in table 4 and modified with the values in table 7:

TABLE 7

Formula: Desired amount (B)/Developed amount (A) = Factor (C)
B/A = C
40.00 (B)/791.666 (A) = 0.050526 (C)
Then take the developed amount of each color and multiply by the factor to arrive at the desired amount of each color in inches:
The preferred lowest measuring amount is 0.0625 inch (1/16)-round figures up or down accordingly.

| BASE | Developed amount Qty. (in inches) | Factor | Desired amount Qty. (in inches) | Rounded |
|---|---|---|---|---|
| White(TiO2) | 287.500 | 0.0505263 | 14.526 | 14.50 |
| Yellow Iron Oxide | 296.700 | 0.0505263 | 14.991 | 15.00 |
| Red Iron Oxide | 104.933 | 0.0505263 | 5.302 | 5.3125 |
| Ultramarine Blue | 102.533 | 0.0505263 | 5.181 | 5.1875 |
| TOTAL | 791.666 | | 40.00 | 40.00 |

Once the desired amount in distance is calculated the data can be used to create the guidelines for a color guide card in the preferred embodiment as shown in Table 8

TABLE 8

| Color (sherae) | total distance | Color guide lines |
|---|---|---|
| White (tiO2) | 14.50 | (3) 4 inch lines & (1) 2½ inch line |
| Yellow Iron Oxide | 15.00 | (3) 4 inch line & (1) 3 inch line |
| Red Iron Oxide | 5.3125 | (1) 4 inch line & (1) 1 5/16 inch line |
| Ultramarine Blue | 5.1875 | (1) 4 inch line & (1) 1 3/16 inch line |

These amounts then can be represented as 40 on color guide card 38.

Accessories

Several accessories may be provided with the apparatus for blending base colors into composite colors and method for making same 20. For instance, a kit may be formed that contains a palette 31, a variety of color guide cards 38, an instruction guide 30, a palette knife 27, a plurality of primary bases 21-25, at least one storage container 28 for composite mixture and at least one latex sponge 26. The variety of color guide cards 38 may come in a booklet 29 so that a user can easily choose a target color to create. Three color cards (sherae, red b' gone and laura) are shown in FIG. 3. FIG. 4 provides a measuring device in standard measurement 44 and metric measurement 45 that may be added as an accessory. The respective list of base colors and their corresponding distances in inches (calculated by the same methods as put forth in TABLE 6, 7 and 8) for creating the composite colors in sherae 38, red b' gone 41a and laura 41b are provided in Table 9. Additionally, an easy to follow directions booklet 30 would accompany the preferred embodiment of an apparatus for combining base colors into composite colors and method for the same 20.

TABLE 9

| Description | Weight (100 g) | Factor | Distance (total) | Distance (40 inch) | Distance (rounded) |
|---|---|---|---|---|---|
| Color sherae | | | | | |
| Titanium Dioxide White | 54.625 | 0.19 | 287.500 | 14.526 | 14.50 |
| Yellow Iron Oxide | 26.703 | 0.09 | 296.700 | 14.991 | 15.00 |
| Red Iron Oxide | 9.444 | 0.09 | 104.933 | 5.302 | 5.3125 |
| Ultramarine Blue | 9.228 | 0.09 | 102.533 | 5.181 | 5.1875 |
| Total | 100.00 | | 791.666 | 40.00 | 40.00 |
| Color red b' gone | | | | | |
| Titanium Dioxide White | 88.14 | 0.19 | 463.895 | 31.151 | 31.125 |
| Yellow Iron Oxide | 6.29 | 0.09 | 69.889 | 4.693 | 4.6875 |
| Red Iron Oxide | 0.66 | 0.09 | 7.333 | 0.492 | 0.50 |
| Ultramarine Blue | 4.25 | 0.09 | 47.222 | 3.171 | 3.1875 |
| Black Iron Oxide | 0.66 | 0.09 | 7.333 | 0.492 | 0.50 |
| Total | 100.00 | | 595.672 | 39.999 | 40.00 |
| Color laura | | | | | |
| Titanium Dioxide White | 87.06 | 0.19 | 458.211 | 30.446 | 30.4375 |
| Yellow Iron Oxide | 6.49 | 0.09 | 72.111 | 4.791 | 4.8125 |
| Red Iron Oxide | 3.88 | 0.09 | 43.111 | 2.865 | 2.875 |
| Ultramarine Blue | 1.27 | 0.09 | 14.111 | 0.938 | 0.9375 |
| Black Iron Oxide | 1.30 | 0.09 | 14.444 | 0.960 | 0.9375 |
| Total | 100.00 | | 601.988 | 40.00 | 40.00 |

Manner of Use

Referring now to FIG. 6, the process and method for using the apparatus to blend base colors into composite colors 20 is as follows. At step 54 the consumer may choose a target color to create from a plurality of color guide cards provided 29. The consumer may then insert the selected color guide card into the palette 31 at step 55. At step 56, the consumer may apply the base colors with their respective amounts as provided on the color guide card. The consumer may mix the colors at room temperature using a palette knife until the consumer achieves a homogeneous mixture (step 57). At step 58, the consumer may modify the final color by adding additional primary and adjusting base colors and mixing as per step 60. If the consumer is finished mixing, the consumer may use or store the finished composite color in a container (step 59).

Additional Base Colors that may be Used

The following organic and inorganic pigments may be used as primary colors including pearlescent pigments, preferably as primary colors for face and cheek cosmetic applications:

Titanium dioxide

Iron oxides (black, yellow, red)

Ultramarines (blue, pink)
Mica
Zinc Oxide
Bismuth oxychloride
Chromium Oxide Green
Chromium Hydroxide Green
Manganese Violet
Ferric Ferrocyanide
FD&C Blue #1 Lake
FD&C Red #40 Lake
FD&C Yellow #5 Lake
D&C Red #6 Lake
D&C Red #7 Lake
D&C Red #27 Lake
D&C Red #28 Lake
D&C Red #30 Lake
D&C Red #33 Lake
Carmine The following organic and inorganic pigments may be used as primary colors, preferably as primary colors for cosmetic applications for the eye (which can also include pearlescent pigments):
Titanium dioxide
Iron oxides (black, yellow, red)
Ultramarines (blue, pink)
Mica
Zinc Oxide
Bismuth oxychloride
Chromium Oxide Green
Chromium Hydroxide Green
Manganese Violet
Ferric Ferrocyanide
FD&C Blue #1 Lake
FD&C Red #40 Lake
FD&C Yellow #5 Lake
Carmine The following organic and inorganic pigments may be used as primary colors, preferably as primary colors for cosmetic applications for the lips (which can also include pearlescent pigments):
Titanium dioxide
Iron oxides (black, yellow, red)
Ultramarines (blue, pink)
Mica
Bismuth oxychloride
FD&C Blue #1 Lake
FD&C Red #40 Lake
FD&C Yellow #5 Lake
D&C Red #6 Lake
D&C Red #7 Lake
D&C Red #27 Lake
D&C Red #28 Lake
D&C Red #30 Lake
D&C Red #33 Lake
Carmine FDA approved colorants for cosmetics may also be used as primary colors. They include the following organic, inorganic and natural colorants and metal oxides:
Color Additives Approved for use in Cosmetics.
Part 73, Subpart C: Color additives exempt from batch certification.
73.2030-Annatto
73.2085-Caramel
73.2087-Carmine
73.2095-Carotene
73.2110-Bismuth Citrate (3)
73.2120-Disodium EDTA-copper
73.2125-Potassium Sodium Copper Chlorophyllin (Chlorophyllin Copper Complex)
73.2150-Dihydroxyacetone
73.2162-Bismuth Oxychloride
73.2180-Guaiazulene
73.2190-Henna(3)
73.2250-Iron Oxides
73.2298-Ferric Ammonium Ferrocyanide
73.2299-Ferric Ferrocyanide
73.2326-Chromium Hydroxide Green
73.2327-Chromium Oxide Greens
73.2329-Guanine
73.2396-Lead Acetate(3)
73.2400-Pyrophyllite
73.2496-Mica
73.2500-Silver(3)
73.2575-Titanium Dioxide
73.2645-Aluminum Powder
73.2646-Bronze Powder
73.2647-Copper Powder
73.2725-Ultramarines
73.2775-Manganese Violet
73.2991-Zinc Oxide
73.2995-Luminescent Zinc Sulfide (3)
Color Additives Approved for use in Comsetics.
Part 74, Subpart C, Color additives subject to batch certification.
74.2101-FD&C Blue No. 1
74.2104-D&C Blue No. 4
74.2151-D&C Brown No. 1
74.2203-FD&C Green No. 3
74.2205-D&C Green No. 5
74.2206-D&C Green No. 6
74.2208-D&C Green No. 8
74.2254-D&C Orange No. 4
74.2255-D&C Orange No. 5
74.2260-D&C Orange No. 10
74.2261-D&C Orange No. 11
74.2304-FD&C Red No. 4
74.2306-D&C Red No. 6
74.2307-D&C Red No. 7
74.2317-D&C Red No. 17
74.2321-D&C Red No. 21
74.2322-D&C Red No. 22
74.2327-D&C Red No. 27
74.2328-D&C Red No. 28
74.2330-D&C Red No. 30
74.2331-D&C Red No. 31
74.2333-D&C Red No. 33
74.2334-D&C Red No. 34
74.2336-D&C Red No. 36
74.2340-FD&C Red No. 40(3)
74.2602-D&C Violet No. 2
74.2602a-Ext. D&C Violet No. 2
74.2705-FD&C Yellow No. 5
74.2706-FD&C Yellow No. 6
74.2707-D&C Yellow No. 7
74.2707a-Ext. D&C Yellow No. 7
74.2708-D&C Yellow No. 8
74.2710-D&C Yellow No. 10
74.2711-D&C Yellow No. 11

*(3) petetioned for use after the 1960 amendments; not provisionally listed.

Palette $2^{ND}$ Design

Palette 61 (FIG. 7) is preferably made of three layers of acrylic glass. Other materials known in the art may be used.

The first 65 and third 63 layers of the palette 61 are preferably of the same dimension and shape. The second layer 64 has the same outer dimensions and shape of the first 65 and third 63 layers. At least one slot 66 or 67 is preferably defined by the second layer 64 to accommodate a color guide card 38. The color guide card 38 preferably fits snugly within the hollowed slots in 64 and may preferably slide in and out of hollowed slots in 64. Hollowed slots in 64 could equally accept additional color guide cards as shown in 29, 38, 41, 41a, 41b, 44 and 45.

The second layer 64 is preferably conifgured to be positioned in between the first 65 and third 63 layers, and thus the first 65 and third 63 layers, serve as the top and the bottom layers, respectively or vice versa. The user may mix base pigments on the first layer 65 and may refer to the color guide card 38, which may be seen through the transparent first layer 65, during the mixing process for guidance as to the proper amount of particular base pigment to use. A first palette handle 68 is provided for carrying the palette 61. First palette handle 68 is preferably defined by the first 65, second 64 and third 63 layers of the palette. Additionally, first palette handle 68 is preferably sized to accommodate at least some of the user's fingers.

A second palette handle 69 may further be provided. The second palette handle 69 is preferably formed on an edge of the palette 61. The second palette handle 69 may allow the user to hold the palette 61 and place an edge that is opposite the edge that defines the second palette handle against a portion of the user's body, such as an arm or torso. The user may then place his hand or fingers on or around handle 69 to hold palette 61.

Palette $3^{RD}$ Design

Palette 62 (FIG. 8) is preferably made of two layers of acrylic glass. Other materials known in the art may be used. The first 71 and second 70 layers of the palette 62 are preferably of the same dimensions and shape. In between the first 71 and second 70 layer are two measurement cards, one in standard measurement 44 and one in metric measurement 45. The measurement device can additionally be embossed, printed or embedded into or on the acrylic glass and further be equally viewable from either side of the palette.

The measurement cards 44 and 45 are preferably configured to be positioned in between the first 71 and second 70 layers, and thus the first 71 and second 70 layers serve as the top and the bottom layers, respectively or vice versa. The user may mix colors on the first layer 71 and may refer to the measurement cards 44 and 45, which may be seen through the transparent first layer 71, during the mixing process for guidance as to the proper amount of particular base pigment to use. A first palette handle 72 is provided for carrying the palette 62. First palette handle 72 is preferably defined by the first 71 and second 70 layers of the palette. Additionally, first palette handle 72 is preferably sized to accommodate at least some of the user's fingers.

A second palette handle 73 may further be provided. The second palette handle 73 is preferably formed on an edge of the palette 62. The second palette handle 73 may allow the user to hold the palette 62 and place an edge that is opposite the edge that defines the second palette handle against a portion of the user's body, such as an arm or a torso. The user may then place his hand or fingers on or around handle 73 to hold palette 62.

Color Guide Alternatives

An additional method for displaying color guide formulas is embodied in FIG. 4 item 43, which displays the desired target color 43a and provides a written description of the primary and adjusting base colors to be used accompanied by the proper measurement distance in both standard and metric measurement for each primary and adjusting base color 43b. This color guide display method can be utilized with measurement cards 44 and 45 as well as with third palette design 62. Additionally, this method of delivering color formula information can be presented in a plurality of methods by a plurality of means, including but not limited to: book format and a plurality of printed media, digitally or electronically distributed through email, internet web pages, computer programs and a plurality of digital or electronic communication distribution methods. These methods can be employed in a plurality of ways and still fall within the scope of the invention.

Using a Plurality of Pre-Made Bases

In addition, by utilizing third palette design 62 or measurement cards 44 and 45 in palette 31 or second palette design 61 the consumer can develop and quantify their own composite colors from a plurality of primary and adjusting base sources, such as but not limited to; artistic colors including paints typically referred to as oils, acrylics, tempras and latex or a plurality of others, by further ultilizing the process steps as presented in FIG. 5, steps 50-53 (as well as through the method demonstrated in table(s) 4 through 8) and additionally recording the tube sizes or component size and/or orifice size of the primary and adjusting base colors they are using as well as the source of the primary and adjusting base colors and by considering these factors in successive blending of said composite color, can reproduce said composite colors at will.

It can now be appreciated that certain embodiments of the present invention takes the guesswork out of blending base pigments into composite colors. Certain embodiments of the present invention provide the end user/consumer with a guide to create truly custom colors and record their own unique composite color blends. Certain embodiments of the present invention further aid the user in learning color theory. For artistic applications, such as in painting, the present invention serves as a learning aid and a reference guide to quickly match and re-match composite colors for use. For cosmetic applications, the present invention allows the end user/consumer to match a true skin tone or custom color quickly, easily and consistently.

Although the description above contains many specifications, these should not be construed as limiting the scope of the invention but as merely providing illustrations of some of presently preferred embodiments of this invention. For example, the sizes and shapes of the palette may vary. The sizes and number of openings in the palette may vary. Other primary colors may be used for cosmetic or artistic colors. The quantities of primary base colors can vary as well as the mediums in which the primary and adjusting base colors are made. The specific types of kits offered may be modified and comprised of different types of accessories. The size and shape of the color guide cards as well as the arrangement of certain areas of the color guide cards may be modified and still fall within the scope of the invention.

What is claimed is:

1. An apparatus for blending a plurality of base pigments into composite colors comprising:
  a palette having a formula color guide card insertion slot formed therein, the palette comprising a substantially transparent and planar first layer disposed above a third layer to form the formula color guide insertion slot; and
  a formula color guide card disposed in the insertion slot, the formula color guide card having pre-designated base pigment guidelines and a final target color printed thereon, wherein each pigment guideline is associated with a different base pigment and dimensions of each pigment guideline indicates an amount of the associated base pigment required to make the final target color, and wherein the pigment guidelines are viewable through the first layer to enable application of base pigments on the first layer in correspondence with the pigment guidelines in amounts that produce the final target color when mixed together.

2. An apparatus for blending base pigments into composite colors as in claim 1 further comprising:
a second layer disposed between the first and third layers and forming sidewalls for defining the insertion slot.

3. An apparatus for blending base pigments into composite colors as in claim 1, wherein the palette first layer is comprised of clear acrylic.

4. An apparatus for blending base pigments into composite colors as in claim 1, wherein the plurality of base pigments comprise:
cosmetics applications base pigments having one or more of a plurality of pigment types, including: titanium dioxide, D&C colorants, FD&C colorants, organic pigments, inorganic pigments, pearlescent pigments, natural pigments, metal oxides and ultramarines.

5. An apparatus for blending base pigments into composite colors as in claim 1 further comprising:
artistic application base pigments having one or more of a plurality of pigment types and bases, including: oils, acrylics, tempras, latex and water colors.

6. An apparatus for blending base pigments into composite colors as in claim 1 wherein:
the plurality of base pigments are provided from a plurality of mediums.

7. An apparatus for blending base pigments into composite colors as in claim 1, the formula color guide card further comprising:
a wet color mark that shows the target color in a wet state, wherein the final target color printed therein on shows the target color in a dry state.

8. An apparatus for blending base pigments into composite colors as in claim 1 further comprising:
a printed color guide reference with color guide formulas indicated thereon, including base pigment identifications and measurement quantities.

9. An apparatus for blending base pigments into composite colors as in claim 8 wherein:
the color guide formulas are in digital/electronic format for distribution electronically or digitally through at least one electronic medium.

10. An apparatus for blending base pigments into composite colors as in claim 1, wherein the pigment guideline dimension is length.

11. A composite color blending kit for blending a plurality of base pigments into composite colors, the kit comprising:
a plurality of base pigments;
a palette having a formula color guide card insertion slot formed therein, the palette comprising a substantially transparent and planar first layer disposed above a third layer to form the formula color guide insertion slot; and
a formula color guide card disposed in the insertion slot, the formula color guide card having pre-designated base pigment guidelines and a final target color printed thereon, wherein each pigment guideline is associated with a different base pigment and dimensions of each pigment guideline indicates an amount of the associated base pigment required to make the final target color, and wherein the pigment guidelines are viewable through the first layer to enable application of base pigments on the first layer in correspondence with the pigment guidelines in amounts that produce the final target color when mixed together.

12. The kit of claim 11, further comprising a palette knife configured to blend the base pigments into a composite color to form the target color.

13. The kit of claim 11, further comprising at least one storage container configured for the storage of blended composite colors.

14. The kit of claim 11, wherein plurality of base pigments comprise:
cosmetics applications base pigments having one or more of a plurality of pigment types, including: titanium dioxide, D&C colorants, FD&C colorants, organic pigments, inorganic pigments, pearlescent pigments, natural pigments, metal oxides and ultramarines.

* * * * *